Figure 1:
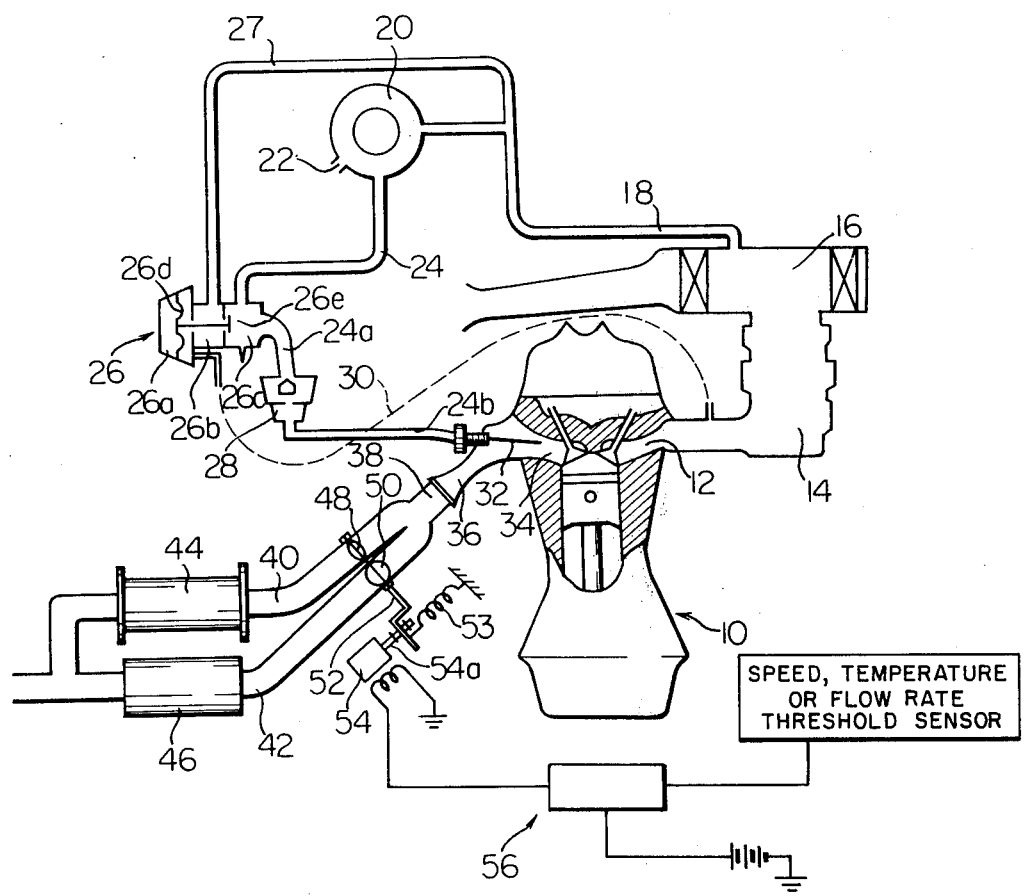

United States Patent [19]

Miyamori et al.

[11] 3,992,879

[45] Nov. 23, 1976

[54] EXHAUST GAS CLEANER

[75] Inventors: Yukio Miyamori; Kenji Masaki; Shuya Nambu, all of Yokohama, Japan

[73] Assignee: Nissan Motor Co., Ltd., Tokyo, Japan

[22] Filed: Nov. 20, 1975

[21] Appl. No.: 633,685

Related U.S. Application Data

[63] Continuation of Ser. No. 419,927, Nov. 29, 1973, abandoned.

[30] Foreign Application Priority Data

Nov. 30, 1972 Japan .............................. 47-120173

[52] U.S. Cl. ................................... 60/288; 60/294
[51] Int. Cl.² .......................................... F02B 75/10
[58] Field of Search .............................. 60/288, 294

[56] References Cited

UNITED STATES PATENTS

| | | | |
|---|---|---|---|
| 3,273,971 | 9/1966 | Baddorf | 60/288 |
| 3,282,046 | 11/1966 | Walker | 60/288 |
| 3,338,682 | 8/1967 | Fowler | 60/288 |
| 3,361,350 | 1/1968 | Genbauffe | 60/288 |
| 3,406,515 | 10/1968 | Behrens | 60/288 |
| 3,590,578 | 7/1971 | Yagi | 60/288 |

*Primary Examiner*—Douglas Hart

[57] ABSTRACT

Exhaust gas is passed through a thermal reactor at high exhaust gas temperature and flow rate, and through a catalytic converter at low values of these parameters. Alternatively, exhaust gas may be passed through the thermal reactor at high values of the parameters, and through both the thermal reactor and the catalytic converter at low values.

6 Claims, 2 Drawing Figures

EXHAUST GAS CLEANER

This is a continuation of application Ser. No. 419,927, filed Nov. 29, 1973, now abandoned.

The present invention relates to an exhaust gas cleaner for a vehicle, and, more particularly, to an exhaust gas cleaner having a catalytic converter and a thermal reactor for the purification of exhaust gases from an internal combustion engine.

It is well known to employ a catalytic converter containing an oxidation catalyst to purify exhaust gases from a gasoline-powered internal combustion engine. It is also well known that a catalytic converter is a very effective means of purifying exhaust gases. However, a catalytic converter has a disadvantage in that the activity of the catalyst used will be reduced in a relatively short period of time by catalyst poisoning materials such as lead, phosphorous, sulfur, zinc, and their compounds with other materials.

These poisonous materials are contained in fuels and lubricating oils used in internal combustion engines as basic constituents or additives for improving the effectiveness of the fuels and lubricating oils. These materials convert into complex compounds during combustion in an engine combustion chamber, and are introduced along with combustion products into the catalytic converter to poison the catalyst.

The degree of poisoning of a catalyst in a catalytic converter is approximately proportional to the amount of poisonous materials contained in the fuel and lubricating oil, and the volume of exhaust gases passing through the catalytic converter.

On the contrary, a thermal reactor, another type of exhaust purifying device, is not affected by the above-mentioned poisonous materials. In addition, a thermal reactor is not damaged by high temperatures at which a catalyst would be damaged.

In view of the above, an exhaust gas cleaner of this invention comprises a catalytic converter and a thermal reactor. Purification of exhaust gases from an internal combustion engine is carried out by the catalytic converter at relatively low temperature and low exhaust gas flow rate such as during light and medium load operating conditions, and by the thermal reactor at relatively high temperature and high exhaust gas flow rate such as during heavy load operation.

An object of this invention, therefore, to provide an exhaust gas cleaner to effectively prevent release of noxious constituents of exhaust gases to the atmosphere under all operating conditions of an internal combustion engine.

Another object of this invention is to provide an exhaust gas cleaner which is capable of operating effectively for long periods of time on exhaust gases containing catalyst poisoning materials resulting from combustion of fuels and lubricating oils.

A further object of this invention is to provide a simple and inexpensive configuration of an exhaust gas cleaner which may be easily adapted to the exhaust gas systems of existing automotive equipment.

Figure 2:
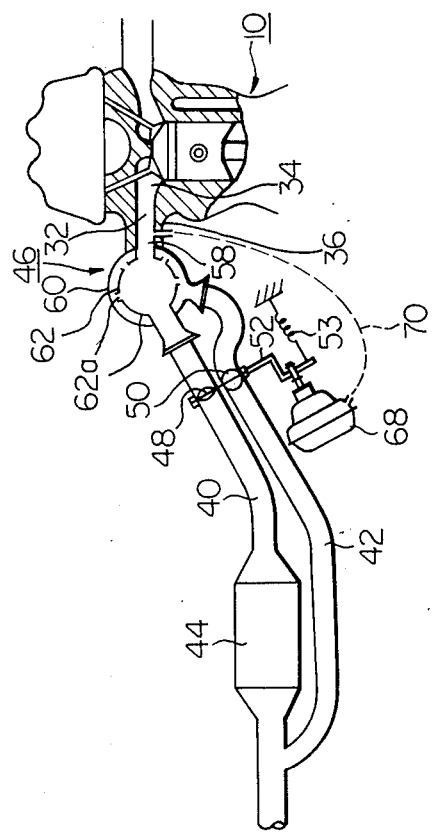

These and other objects, features and advantages of the invention will become apparent from the following description and claims, taken in conjunction with the accompanying drawings wherein:

FIG. 1 is a diagrammatic view of an internal combustion engine employing one embodiment of this invention; and FIG. 2 is a diagrammatic view of an internal combustion engine employing another embodiment of this invention.

Referring now to FIG. 1, there is shown a preferred embodiment of an exhaust gas cleaner according to the present invention, herein shown as incorporated in an internal combustion engine which is generally designated by a reference numeral 10. The engine 10 has, as customary, an intake port 12, which communicates with a carburetor 14 which in turn communicates with an air cleaner 16 for filtering intake air. Air from the air cleaner 16 flows through a secondary air intake pipe 18 into an air pump 20.

The air pump 20 supplies secondary air to oxidize combustible constituents of exhaust gas into an engine intake manifold is a manner which will be subsequently described. The air pump 20 is provided with a safety valve 22 and secondary air discharge pipe 24 which communicates with a flow control valve 26. The flow control valve 26 comprises a first compartment 26a in which a diaphragm 26d is disposed, a second compartment 26b and third compartment 26c. The second compartment 26b communicates with the third compartment 26c through an opening. A valve element 26e fixed to the diaphragm 26d opens and closes the opening to control the flow of secondary air in response to a second selected engine operating parameter such as intake manifold vacuum introduced through a conduit as shown by a dotted line 30. The second compartment 26b opens into a by-pass pipe 27 which communicates with the secondary air intake pipe 18 to by-pass air thereinto at a rate metered by the valve element 26e. The control valve 26 is connected to a secondary air discharge pipe 24a which communicates through a back-fire suppressor valve 28 with a secondary air discharge pipe 24b which in turn communicates with an engine exhaust port 34 through a secondary air injection nozzle 32.

The exhaust port 34 communicates with an exhaust manifold 36 which in turn communicates with an exhaust pipe 38. The exhaust pipe 38 diverges into first and second pipes 40 and 42 which are shown as being interconnected at their downstream ends. The first pipe 40 has a catalytic converter 44 disposed therein while the second pipe 42 has a thermal reactor 46 disposed therein. The catalytic converter 44 catalytically oxidizes toxic unburned constituents of exhaust gases from the engine 10 to convert them into non-toxic compounds, while the thermal reactor 46 thermally oxidizes toxic unburned constituents in exhaust gases to convert them into non-toxic compounds.

A first disk type butterfly valve 48 is rotatably disposed upstream of the catalytic converter 44 in the first pipe 40, and a second disk type butterfly valve 50 is rotatably disposed upstream of the thermal reactor 46 in the second pipe 42. These valves 48 and 50 are fixed to a common rotatable shaft 52 which bridges the first and second pipes 40 and 42, and which is biased in one direction by a tension spring 53. The flat surfaces of the butterfly valves 48 and 50 describe an angle of about 90° C therebetween so that one valve is open the other is closed. These valves 48 and 50 direct exhaust gases from the engine 10 into either the catalytic converter 44 or the thermal reactor 46. The shaft 52 is mechanically connected to a magnetic actuator 54.

The magnetic actuator 54 may be a solenoid which is electrically connected to and controlled by a control circuit 56. The control circuit 56 may be of any known arrangement insofar as it responds to a first selected operating parameter (or more than one operating parameter) of the engine such as engine speed, exhaust gas temperature or flow rate to energize and de-energize the magnetic actuator 54 in dependence on whether the level of the parameter is above or below a first predetermined value.

In operation, when a small volume of exhaust gas is being exhausted and its temperature is relatively low such as during light and medium load operation of the engine 10, the magnetic actuator 54 is energized by the control circuit 56 so that the plunger 54a is retracted, thereby rotating the shaft 52 in one direction to open the first valve 48 while closing the second valve 50 so as to direct exhaust gases from the engine 10 into the catalytic converter 44. On the contrary, if the volume of exhaust gas increases beyond a certain level and/or the temperature thereof reaches a relatively high level such as during heavy load operation of the engine 10, the magnetic actuator 54 is de-energized so that the plunger 54a is pulled out of the casing of the magnetic actuator 54 by the force of the spring 53, thereby rotating the shaft 52 in another direction to close the first valve 48 while opening the second valve 50. Thus, exhaust gases are directed from the engine exhaust manifold 36 into the thermal reactor 46.

A modified embodiment of this invention is illustrated in FIG. 2, wherein the same reference numerals are used to designate like component parts. In FIG. 2, the secondary air injection system is omitted for the sake of simplicity of illustration. In this modification, the exhaust port 34 communicates with the thermal reactor 46 through a passage-way 58 and the exhaust manifold 36. The thermal reactor 46 has an outer housing 60 and a perforated inner housing 62 which is disposed inside the outer housing 60 and spaced therefrom.

The outer housing 60 communicates with the second pipe 42. As shown in FIG. 2, the outer housing 60 also communicates with the interior of the inner housing 62 through a plurality of holes 62a. The inner housing 62 communicates at one end with the exhaust port 34 through the passage-way 58 and communicates at its other end with the first pipe 40 leading to the catalytic converter 44.

The first butterfly valve 48 is rotatably disposed upstream of the catalytic converter 44 in the first pipe 40. The second butterfly valve 50 is rotatably disposed downstream of the thermal reactor 46 in the second pipe 42. These valves 48 and 50 are fixed on the common rotatable shaft 52 as in the embodiment of FIG. 1, and operate to direct exhaust gas from the thermal reactor 46 in to either the catalytic converter 44 or the pipe 42 so as to by-pass the catalytic converter 44.

In the modified form shown in FIG. 2, the shaft 52 of the butterfly valves is shown as being mechanically connected to a pressure responsive actuator 68 and actuated thereby. The pressure responsive actuator 68 may be of a type having a diaphragm therein, which responds to the pressure of the exhaust gas in the passage-way 58 introduced through a conduit indicated by a dotted line 70. The diaphragm moves between two extreme positions in dependence on the pressure of the exhaust gas.

In operation, when a small volume of exhaust gas is being exhausted and the temperature thereof is relatively low such as during light and medium load operation of the engine 10, the pressure responsive actuator 68 is energized to rotate the shaft 52 in one direction to open the first valve 48 while closing the second valve 50 so as to direct exhaust gases from the engine 10 into the catalytic converter 44 through the inner housing 62 of the thermal reactor 46. On the contrary, if the volume of exhaust gas increases and the temperature thereof reaches a relatively high level such as during heavy load operation of the engine 10, the pressure responsive actuator 68 is de-energized and the shaft 52 rotates in another direction to close the first valve 48 while opening the second valve 50 to direct exhaust gases from the engine 10 through the thermal reactor 46 into and through the pipe 42. In this case the catalytic converter 44 is by-passed by the pipe 42.

Since the pressure of exhaust gas varies with the operating load of an internal combustion engine the first and second valves 48 and 50 are properly operated by the pressure responsive actuator 68. Accordingly, in this embodiment, exhaust gases from the internal combustion engine 10 can be selectively directed through both the thermal reactor 46 and the catalytic converter 44 during light and medium load operating conditions of the engine 10, or through the thermal reactor 46 only during heavy load operation of the engine 10.

What is claimed is:

1. An exhaust gas cleaner for an internal combustion engine having an exhaust port, comprising:
   exhaust passage-way means communicated with the exhaust port;
   a thermal reactor connected to said exhaust passage-way means;
   first pipe means connected at one end thereof to said thermal reactor;
   a catalytic converter connected to the other end of said first pipe means;
   second pipe means connected at one end thereof to said thermal reactor and at the other end thereof to the atmosphere:
   valve means including a first valve and a second valve, said first valve disposed within said first pipe means and arranged to be opened and closed for establishing and blocking communication between said thermal reactor and said catalytic converter, said second valve disposed within said second pipe means and arranged to be opened and closed for establishing and blocking communication between said thermal reactor and the atmosphere; and
   control means arranged to open said first valve and close said second valve when a selected engine operating parameter is below a predetermined valve, and to close said first valve and open said second valve when said selected engine operating parameter is above the predetermined value.

2. An exhaust gas cleaner as claimed in claim 1, in which said thermal reactor includes an outer housing, and an inner housing disposed within said outer housing and spaced therefrom, said inner housing being communicated with said exhaust passageway means and having a plurality holes therethrough for communication between the inner and outer sides of said inner housing, said first pipe means being connected to said inner housing and communicated with the inner side of said inner housing, whereas said second pipe means being connected to said outer housing and communicated with the outer side of said inner housing.

3. An exhaust gas cleaner as claimed in claim 1, in which said valve means include a rotatable shaft disposed passing through both said first and second pipe means, a first butterfly valve fixed to said rotatable shaft and rotatably disposed within said first pipe means, and a second butterfly valve fixed to said rotatable shaft and rotatably disposed within second pipe means, the flat surface of said first butterfly valve being angularly aligned with respect to the flat surface of said second butterfly valve so that when one valve is fully open the other is fully closed.

4. An exhaust gas cleaner as claimed in claim 3, in which said control means includes means for changing a reciprocative movement into a rotational movement, operatively connected to said rotatable shaft of said valve means, and a pressure responsive actuator having a rod which is reciprocatively movable and operatively connected to said means for changing the movement, said actuator being communicated with said exhaust passage-way means and arranged to rotate the rotatable shaft of said valve means through said means for changing the movement in a direction to open the first butterfly valve and close the second butterfly valve when the exhaust gas pressure within said exhaust passage-way means is below a predetermined level, and to rotate the rotatable shaft in the opposite direction to open the second butterfly valve when the exhaust gas pressure within said exhaust passage-way means is above the predetermined level.

5. An exhaust gas cleaner as claimed in claim 4, in which said means for changing the movement is a crank member mechanically connecting between the rotatable shaft of said valve means and the rod of said pressure responsive actuator.

6. An exhaust gas cleaner as claimed in claim 5, in which said control means further includes a spring connected to a portion of said crank member for normally urging said valve means into a position at which said first butterfly valve is open.

* * * * *